April 17, 1973     A. R. MARTIN     3,728,187
METHOD OF APPLYING ALTERNATE LAYERS OF PLASTIC
FOAM AND GLASS FIBERS TO A METAL TUBE
Filed Oct. 26, 1970
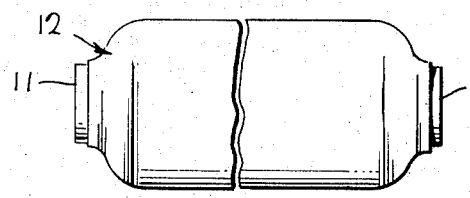
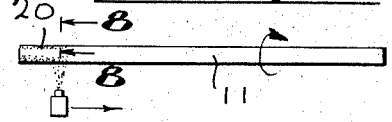
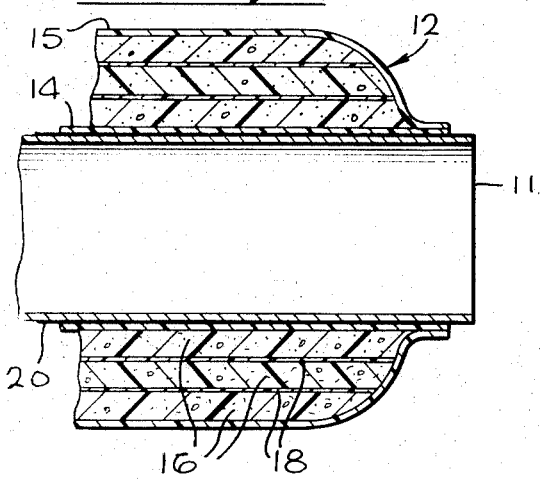
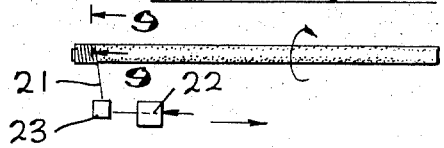
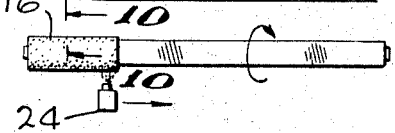
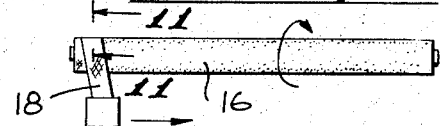
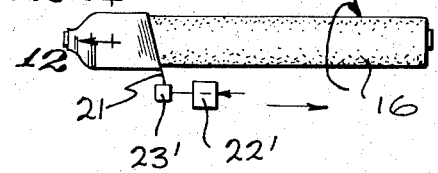
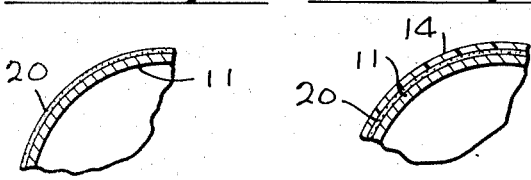
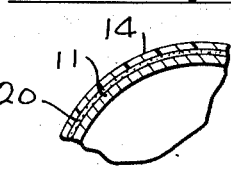
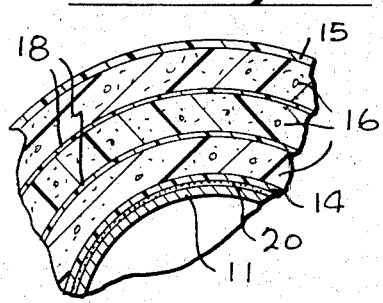
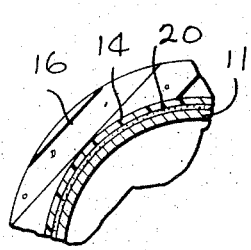
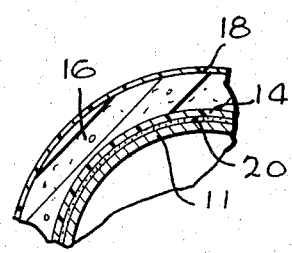
INVENTOR.
ANDREW R. MARTIN
BY
WHANN & McMANIGAL
ATTORNEYS FOR APPLICANT

United States Patent Office 3,728,187
Patented Apr. 17, 1973

3,728,187
METHOD OF APPLYING ALTERNATE LAYERS OF PLASTIC FOAM AND GLASS FIBERS TO A METAL TUBE
Andrew R. Martin, 1782 Plaza Del Amo, Torrance, Calif. 90501
Filed Oct. 26, 1970, Ser. No. 83,798
Int. Cl. B31c 13/00; B65h 81/00; F16l 59/00
U.S. Cl. 156—162
7 Claims

ABSTRACT OF THE DISCLOSURE

Alternate layers of plastic foam and glass fiber fabric between inner and outer moisture impervious walls of glass fiber filament-wound plastic layers forming a unitary jacket applied over a metal tube with a substance between the tube and the jacket preventing adherence of the jacket to the tube.

This invention has to do generally with the insulation of metal pipe, tubing and vessels to minimize heat transfer and particularly with insulation suitable for cryogenic applications where the pipe or other hollow body may carry or contain a substance having a very low temperature.

Various types of insulation have been used in jacketing pipes, tubing and tanks and other containers in cryogenic installations but so far as I am aware considerable difficulty has been experienced because of the large degree of contraction and expansion of the pipe or conduit relative to the insulation as the former is placed in service or taken out of service due to the great differences in the coefficient of expansion of the metal and the insulation material. Even where plastic foam insulation has been used it has proved unsatisfactory because of its tendency to rupture when subjected to the stresses caused by unequal expansion and contraction of the jacket and the pipe.

Therefore an object of the present invention is to provide a new and improved method of forming an insulation jacket around an object to be insulated, such as a metal pipe or container, which results in a greatly improved, highly efficient insulation jacket that is structurally durable against damage from rupture such as usually results from the contraction and expansion of the object insulated and of itself due to great changes in the temperature of the object.

A further object is to provide a novel and improved insulated conduit or container.

Another object is to provide a new and improved insulation jacket.

In summary it is an object to provide a novel insulation in which a metal pipe or the like is insulated by means of alternate layers of plastic foam and glass fiber fabric confined between an inner and an outer moisture impervious wall of glass fiber filament plastic layers in conjunction with means which prevents the adherence of the jacket to the pipe.

These and other objects will be apparent from the drawing and the following description. Referring to the drawing:

FIG. 1 is an elevational view of an insulated pipe embodying the invention;

FIG. 2 is a fragmentary longitudinal sectional view of the device of FIG. 1 but on a larger scale;

FIG. 3 is a diagrammatic view showing the application of an undercoating to the pipe;

FIG. 4 is a view similar to FIG. 3 but showing the application of the inner layer of insulation material or inner wall of the insulation jacket over the undercoating;

FIG. 5 is a view similar to FIG. 3 but showing the application of a layer of foam plastic over the inner layer being applied in FIG. 4;

FIG. 6 is a view similar to FIG. 3 but showing the application of a glass fiber cloth or the like over the previously applied material;

FIG. 7 is a view similar to FIG. 3 but showing the application of the outer layer of material or cover;

FIGS. 8, 9, 10, 11 and 12 are fragmentary cross-sectional view on lines 8—8, 9—9, 10—10, 11—11 and 12—12 of FIGS. 3, 4, 5, 6 and 7 respectively.

More particularly describing the invention, in FIGS. 1 and 2 I show an insulated or jacketed pipe comprising a metal pipe 11 and an insulation jacket 12 thereon. It will be understood that a vessel or tank might be insulated in place of the pipe 11. In general the jacket comprises a moisture impervious inner wall 14 which closely engages the outer surface of the pipe 11 and a moisture impervious outer wall or cover 15. These walls are preferably formed of glass fiber yarn or fabric and a suitable synthetic resin. Between the inner and outer layers are several layers of plastic foam, designated 16, and these are separated by fabric layers 18 of glass fibers.

In making the jacket, the pipe 11 is first coated with a very thin layer 20 of material designed to prevent the jacket from adhering to the pipe so that the latter can expand and contract longitudinally without affecting the insulation jacket. The coating may be a conventional mold release agent or a plastic film or a coating of wax or wax paper. If the coating is a plastic film, it must be of a type which will not bond to the material of the inner wall 14.

The inner layer 14 of the jacket is then applied to the pipe body over the coating layer. The inner layer is preferably made of glass fiber yarn, such as fiber glass and a suitable synthetic resin of an epoxy or polyester type. Preferably the yarn-like material is wound under tension and in FIG. 4 I show a tape or filament 21 of the yarn being run through a bath 22 of the resin and being wound helically about the pipe by a device 23 which moves longitudinally of the pipe and maintains tension on the material as the pipe is rotated by any conventional means (not shown).

After the first layer has been wound to form the inner wall 14, the outer surface thereof is coated with a substantial thickness of foam plastic 16, such as urethane foam. This may be sprayed on as shown in FIG. 5 by a suitable applicator 24 which travels longitudinally of the pipe as the latter is rotated. After the application of the layer of foam insulation, a woven cloth layer 18 of glass fiber is wrapped around the foam layer under slight tension. This layer of material may be in the form of a band that is wrapped around the pipe as shown in FIG. 6.

Another layer 16 of foam plastic insulation is then applied over the cloth 18 as previously described and then another layer of cloth applied over this. As many alternate layers of foam and cloth as desired can be applied after which the moisture impervious outer layer of glass fiber and plastic is applied in the same manner as the inner layer, as shown in FIG. 7, namely the filament or tape of yarn-like material is run through a suitable resin bath 22' and applied under substantial tension by device 23' as it is wound helically around the last layer of foam plastic. This last layer is wound over the ends of the layers 16 and 18 to fully enclose the material in the jacket.

The foam insulation layers should not be too thick and preferably not over about two inches in thickness in order to prevent tearing under extreme cold conditions as the jacket and pipe contract. The layers of glass fiber woven fabric hold the layers of foam together, and, being wound under tension also serve as parting lines between the layers of foam so that the innermost layer, as it contracts, can separate from the next layer, and the second from the third layer and so on without tearing the foam, and therefore the jacket as a whole withstands severe conditions of expansion and contraction under extreme variations of temperature.

I claim:

1. The method of providing a cryogenic insulation jacket for a section of metal pipe which comprises the steps of coating the pipe with a thin layer of a substance characterized by the quality of preventing the adherence of a subsequently applied layer composed in large part of synthetic resin and glass fibers, applying an inner layer of glass fibers and resin to the pipe over said coating to form a continuous moisture imprevious inner wall, applying at least one intermediate layer of plastic foam insulation over said inner wall, and applying an outer layer of glass fibers and resin over said foam insulation to form a continuous moisture-impervious cover.

2. The method set forth in claim 1, including the steps of applying said inner and outer layers so that they extend beyond the intermediate layer of plastic foam insulation therebetween and fully enclose said intermediate layer of plastic foam insulation.

3. The method set forth in claim 1, including the steps of applying alternate layers of plastic foam insulation and glass fiber fabric over said inner layer and applying said outer layer over the ends of the alternate layers of plastic foam insulation and glass fiber fabric so as to fully enclose said alternate layers.

4. The method set forth in claim 3, including the step of applying said outer layer by winding it under tension about the previously applied layers.

5. The method set forth in claim 3, including the steps of winding said glass fiber fabric layers under tension around the intermediate layers of plastic foam insulation.

6. The method of providing a cryogenic insulation jacket for a section of metal pipe carrying a cryogenic material which comprises the steps of:
 (a) coating the pipe with a film of material characterized by the quality of preventing adherence of a subsequently applied layer composed in large part of synthetic resin and glass fiber yarn;
 (b) applying an inner layer of glass fiber yarn and resin to the pipe over said coating to form a continuous moisture-impervious inner wall, said glass fiber yarn being wound around the pipe under tension;
 (c) applying at least one intermediate layer of foam insulation material over said inner wall; and
 (d) applying an outer layer of glass fiber yarn and resin over said foam insulating material to form a continuous moisture-impervious cover, said outer layer of glass fiber yarn being wound over the ends of said foam insulating material to fully enclose said foam insulating material.

7. The method set forth in claim 6 in which said foam insulating material is urethane foam.

References Cited

UNITED STATES PATENTS 3,340,117   9/1967   Inove _____ 156—289 X

PHILIP DIER, Primary Examiner

U.S. Cl. X.R.

138—144, 149; 156—172, 190, 192, 289; 161—190; 220—9